Sept. 23, 1930. E. KREISSIG 1,776,261
SPRING SUPPORTED VEHICLE AND MACHINE ELEMENT
Filed April 24, 1925 2 Sheets-Sheet 1

Inventor

Sept. 23, 1930.  E. KREISSIG  1,776,261
SPRING SUPPORTED VEHICLE AND MACHINE ELEMENT
Filed April 24, 1925   2 Sheets-Sheet 2

Inventor

Patented Sept. 23, 1930

1,776,261

UNITED STATES PATENT OFFICE

ERNST KREISSIG, OF UERDINGEN, GERMANY

SPRING-SUPPORTED VEHICLE AND MACHINE ELEMENT

Application filed April 24, 1925, Serial No. 25,553, and in Germany May 23, 1924.

My invention relates to improvements in spring supported vehicles and machine elements, and the object of the improvements is to provide a spring arrangement for vehicles and parts of other machines which is free of oscillations. As now practised vehicles or oscillatory machine parts are mounted on springs or spring systems the tension of which varies with actual deflection, and if the system is impacted by a force compressing or expanding the spring, the increased tension of the spring acts as an accelerating force upon the return movement of the system by means of which the body supported by the spring is thrown backwardly beyond its normal position. The spring oscillations thus produced are a rather undesirable feature in spring mountings generally, and it is necessary to deaden the same, which may be done for example by internal friction in the spring system. I have found that the oscillations may be avoided by providing a spring system in which means are provided for reducing the spring action caused by the deflection, so that the forces acting in the system are balanced in any position of the parts of the system and an even elastic tension is obtained for any relative position of the parts in elastic connection with each other.

Figure 5:
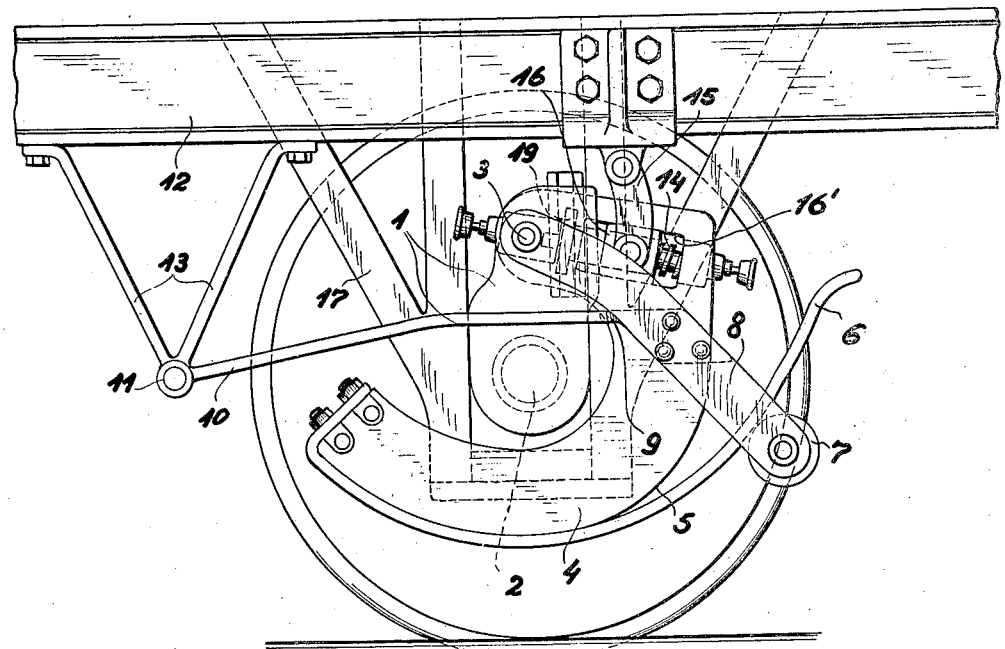
Figure 3:
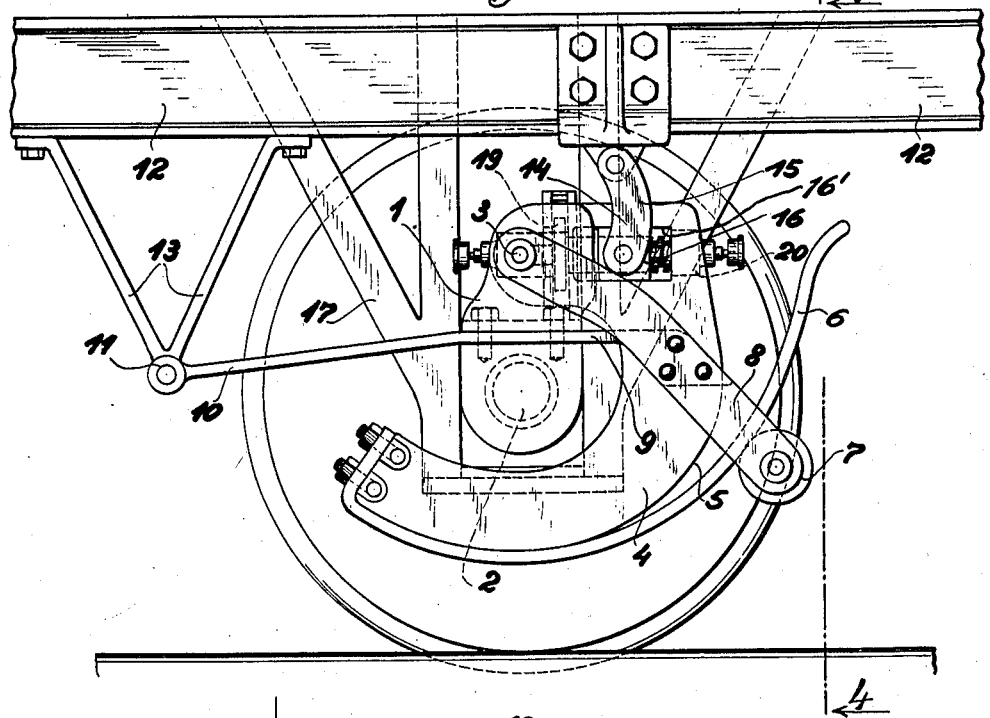
Figure 4:
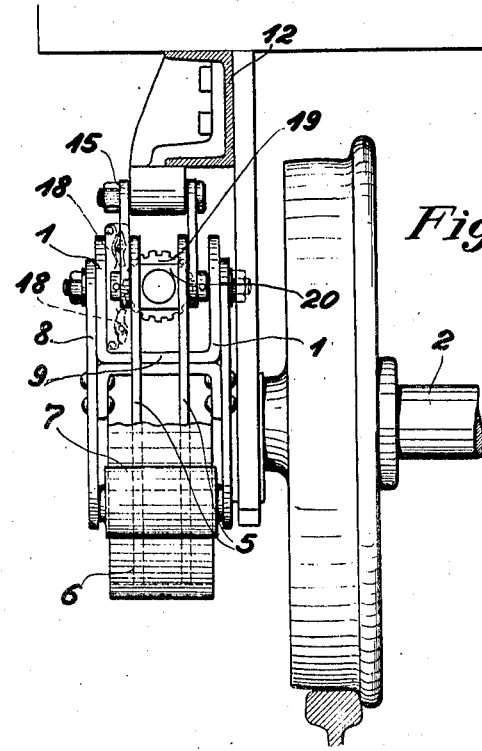

For the purpose of explaining the invention several examples embodying the same have been shown in the accompanying drawings in which the same reference characters have been used in all the views to indicate corresponding parts. In said drawings, Fig. 1, is an elevation showing the basic principle of the system and in a diagrammatical way, Fig. 2, is a similar view illustrative of a modification in the system, Fig. 3, is an elevation of a part of a truck and a wheel comprising my improved spring system, Fig. 4, is a sectional elevation taken on the line 4—4 of Fig. 3, and Fig. 5, is an elevation similar to the one shown in Fig. 3 and showing the parts in different positions.

Figure 1:
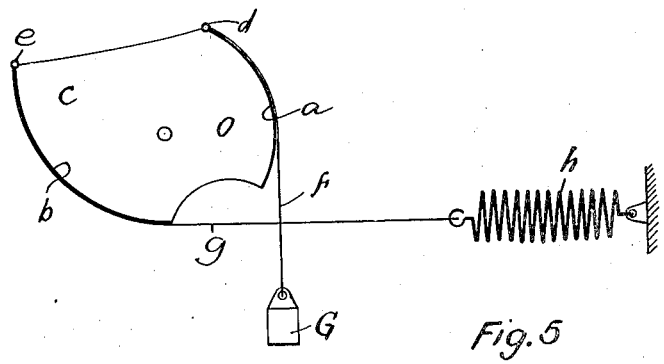

Referring to the example shown in a diagrammatical way in Fig. 1 the spring system comprises a body $c$ rockingly mounted at $o$ and having a concentric face $a$ and an eccentric face $b$. From a part $d$ of the concentric face $a$ a rope $f$ is suspended, which is trained on the face $a$, and which carries a weight or body $G$. To a part $e$ of the eccentric face $b$ a rope $g$ is connected, which is trained on the face $b$, and which is attached to a spring $h$. In the position of the parts shown in Fig. 1 the weight $G$ and the spring $h$ are understood to be in equilibrium, the said equilibrium depending on the forces and the lengths of lever thereof relatively to the axis $o$. The rope $f$ being trained on the concentric face $a$, the moment of the body $G$ is constant, while the moment of the force of the spring $h$ varies according to the angular position of the body $c$. The shape of the face $b$ is such, that in any position of the body $c$ the moments of the gravity of the body $G$ and that of the tension of the spring $h$ are alike, so that the product of spring tension by lever length, that is the moment of the elastic force, remains constant in any position. Thus there will be perfect equilibrium and balance of forces for any position of the body $G$, subject, however, to variations due to spring volumetric strains which my invention is designed to overcome.

Figure 2:
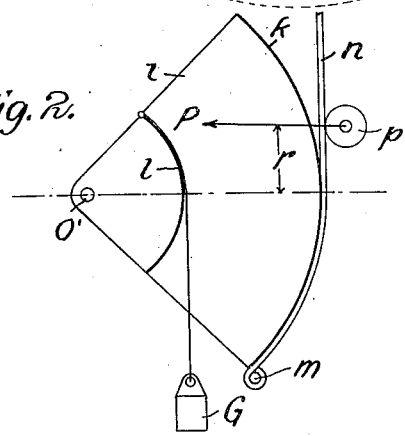

The structure disclosed in Fig. 2 is based on a modification of this principle. If $V$ is the volume of a spring, $k$ the strain to which it is subjected, and $A$ its kinetic energy or capacity of work, $A$ is represented by the following equation:

$$A = V k^2 c$$

$c$ being a constant. $V$ and $k$ are variable quantities and the elastic force being a function of these variables varies with them. All existing kinds of springs are constantly subject to strains in their whole volume, i. e. the factor $V$ remains constant, only the strain $k$ varying with the load, so that a variation of $k$ corresponds with a variation of the load. But if the strain $k$ is kept constant the load also remains constant, only the kinetic energy or elastic force of the spring is increased proportionally to the varied volume. This is a novel and hitherto completely unknown principle in the theory of elastic springs. In Fig. 2 such a spring has been diagrammatically represented.

Round the axis $o'$ oscillates a curved lever $i$ bearing two circular faces $l$ and $k$ parallel and concentric to $o'$. A spring $n$ of optional transverse section and optional initial curvature is connected with the face $k$ at the point $m$ in such a manner, that when the lever $i$ is turned to the right, the spring $n$ being prevented from giving way and turning aside by the supporting roller $p$, leans on the face $k$. Consequently those parts of the spring which lean on the face $k$ are subject to an even strain, but only a part of the whole volume of the spring $n$ which is adequate to the corresponding turn of the lever. The volume of the spring therefore changes with every turn of the lever $i$, but the strain in those parts of the spring which are subjected to it remains constant. Let P represent the pressure of the supporting roller $p$ on the spring $n$ and $r$ the arm of lever of the force P with reference to the centre of motion $o'$, and it is evident that the moment P$r$ acting on the lever $i$ remains constant. As the distance of the tensile organ $g$ rolling and winding itself up on the face $l$ from the centre of motion $o'$ is constant it follows that the moment of G is also constant and that the system is balanced and in equilibrium in any position, if the spring $n$ and the weight G are so chosen that they counterbalance each other in their mutual action.

As such a system will give way under the smallest additional load that may be brought to bear upon it occasionally, it may be advisable under certain conditions to increase the elastic force of the spring a little in order to stabilize the system in its mean position, when it is overbalanced and begins to turn from its mean position. The necessary increment of elastic force may very easily be attained by an adequate modification of the transverse section of the spring $n$ (Fig. 2) or by the action of very weak additional springs.

As the weight of vehicles mounted on springs varies with the load and is very rarely constant, even wind pressure and centrifugal forces influencing the load that is supported by the springs, it is necessary that an increment of the load is automatically counterbalanced by an adequate proportional decrement of the arm of lever of G so that the moment of the spring force is constantly balanced by the moment of G.

In Figs. 3 to 5 such a device has been practically represented.

In the said figures the frame 12 of a vehicle is supported by means of a bracket 17 and a bearing block 1 on an axle 2. On a bolt 3 secured to the block 1 a segmental lever 4 is rockingly mounted, which consists of two sections placed one beside the other. To the said lever a leaf spring 6 is secured which is bent around the curved face 5 and bears on a roller 7 mounted between two arms 8 rockingly mounted on the bolt 3. To the said arms 8 arms 9 are secured which are fixed to the block 1 by screws 21. The arms 9 are extended beyond the block 1, where they are in the form of leaf springs 10 jointed at 11 to a bracket 13 secured to the frame 12. Between the sections of the lever 4 there is a screw-threaded spindle 14 rotatably mounted in blocks 20 connecting the said levers and carrying a nut 16, and on the said nut the frame 12 is supported through the intermediary of links 15. The nut is guided in slots $16^1$ of the levers 4. The block 1 carries a pair of spring pressed pawls 18 adapted to engage respectively from above and below in the teeth of a sprocket wheel 19 secured to the spindle 14 for turning the same to the right or left and shifting the nut 16 towards or away from the fulcrum 3 of the lever 4. As appears from Fig. 4 the pawls are normally out of engagement with the ratchet wheel and they engage in the said wheel only when the load on the frame 12 and the link 15 is increased or reduced.

The operation of the system is as follows: The oscillations of the frame 12 are transmitted through the link 15 and the screw 14 to the lever 4, which is thereby rocked about its fulcrum 3 and deforms the spring 6, the power of the spring remaining constant as has been explained with reference to Fig. 2. If now the load on the vehicle is increased, the spring 6 is further deformed say into the position shown in Fig. 5, in which additional upward pressure is exerted on the frame 12 by the deformation of the leaf spring 10, and if now the vehicle is moved the lever 4 oscillates about the median position shown in Fig. 5, so that the sprocket wheel 19 is engaged by the lower one of the pawls 18. Thereby the spindle 14 is turned in a direction for shifting the nut 16 towards the fulcrum 3, thus reducing the length of lever of the pressure transmitted through the link 15 to the lever 4, so that the said lever is returned into the median position shown in Fig. 3.

In case of a reduction of the load the spring 10 acts in a direction for counteracting the pressure of the spring 6, and the upper pawl 18 is made operative for shifting the nut 16 away from the fulcrum 3.

While in describing the invention reference has been made to particular examples embodying the same I wish it to be understood that my invention is not limited to the constructions shown in the drawings, and that various changes may be made in the general arrangement of the apparatus and the construction of its parts without departing from the invention.

I claim:

1. In a system of the class described, the combination with two bodies movable relatively to each other, of a spring system intermediate said bodies including at least two successively acting springs, one of said springs being primarily subject to deformation on relative movements of the bodies and the other of said springs acting on deformation of the first-named spring to substantially maintain the springs of said system in equilibrium on even loads in any relative position of the said bodies.

2. In a system of the class described, the combination, with two bodies movable relatively to each other, of a spring system intermediate said bodies including a spring subject to deformation, and means supplemental to said spring system for varying the volume of the part of said spring subject to deformation and maintaining the strain of the deformed part of the spring substantially constant on even loads.

3. In a system of the class described the combination, with two bodies movable relatively to each other, of a rocker having a curved face and rockingly mounted on one of said bodies and acted upon by the other body, a member fixed with relation to the rocker, and a spring secured to said rocker and trained on a curved face thereof and bearing on said member.

4. In a system of the class described, the combination, with two bodies movable relatively to each other, of a spring system including a spring interposed between said bodies, a second spring operative upon deformation of said spring system for exerting additional force on said bodies, and means acting on said second spring for maintaining the forces of said springs in equilibrium on even loads.

5. In a system of the class described, the combination, with two bodies movable relatively to each other, of a main elastic system intermediate said bodies, and a second elastic system acting therewith and including means for maintaining said system substantially in equilibrium in any relative position of the said bodies on even loads.

6. In a system of the character described, the combination, with two bodies movable relatively to each other, of a spring system intermediate said bodies, including a spring, a rocker lever, a second spring acting on the lever, and automatic means shiftable under varying loads for varying the effective force of said second spring under movements of said lever.

7. In a system of the character described, the combination with two bodies movable relatively to each other, of a rocking lever, a spring acting on the lever and operative so as to be subject to deformation under load pressure, and so as to have an effective force remaining constant under any even load pressure, and a second spring acting on the lever and on deformation of the first-named spring for maintaining the springs of said system in equilibrium on even loads in any relative position of the said bodies.

8. In a system of the character described, the combination with two bodies movable relatively to each other, of a rocking lever, a spring acting on the lever and operative so as to be subject to deformation under load pressures and so as to have an effective force remaining constant under any even load pressure, a second spring acting on the lever and on deformation of the first-named spring for maintaining the springs of said system in equilibrium on even loads in any relative position of the said bodies, and means connecting said lever with one of said bodies and shiftable under varying loads for varying the volume of the said deformable spring.

In testimony whereof I affix my signature.

ERNST KREISSIG.